(12) United States Patent
Pfeffer

(10) Patent No.: US 7,331,243 B2
(45) Date of Patent: Feb. 19, 2008

(54) FORCE TRANSDUCER FOR MEASURING AXIAL FORCES

(75) Inventor: Otto Pfeffer, Tettnang (DE)

(73) Assignee: EBM Brosa Messgeraete GmbH & Co. KG (DE)

( * ) Notice: Subject to any disclaimer, the term of this patent is extended or adjusted under 35 U.S.C. 154(b) by 96 days.

(21) Appl. No.: 11/183,528

(22) Filed: Jul. 18, 2005

(65) Prior Publication Data

US 2006/0059996 A1 Mar. 23, 2006

Related U.S. Application Data

(63) Continuation of application No. PCT/EP2004/000305, filed on Jan. 16, 2004.

(30) Foreign Application Priority Data

Jan. 16, 2003 (DE) ................ 103 02 349

(51) Int. Cl.
G01B 7/16 (2006.01)
(52) U.S. Cl. ....................... 73/774
(58) Field of Classification Search ............ 73/774
See application file for complete search history.

(56) References Cited

U.S. PATENT DOCUMENTS 3,695,096 A 10/1972 Kutsay ............... 73/88.5
4,136,560 A * 1/1979 Gellos ............... 73/146.8
4,165,637 A 8/1979 Kooman ............... 73/141
4,364,432 A * 12/1982 Bass et al. ............ 166/290
5,490,427 A * 2/1996 Yee et al. ............... 73/767
6,370,971 B1 4/2002 Olson ............ 73/862.634

FOREIGN PATENT DOCUMENTS

| AT | 383 682 B | 12/1986 |
| DE | 85 28 468 | 3/1987 |
| EP | 0 374 498 A2 | 6/1990 |
| GB | 2 039 373 | 8/1980 |
| WO | 02/08712 A1 | 1/2002 |

OTHER PUBLICATIONS

International Search Report (4 pages, Jan. 16, 2004).

* cited by examiner

*Primary Examiner*—Max Noori
(74) *Attorney, Agent, or Firm*—St. Onge Steward Johnston & Reens LLC

(57) ABSTRACT

A force transducer for measuring axial forces which act essentially transversely on an axis, in particular a measuring axis, has a longitudinally extending axial body, which has a first portion, forming a force introduction zone, at least one second portion, forming a bearing zone, and at least one third portion, forming a force measuring zone for measuring the axial forces. The axial body has in the region of the at least one second portion, radially at a distance from the outside of the same, at least one recess extending in the circumferential direction and directed essentially axially, so that an edge of the second portion that is facing the first portion forms a free overhang.

21 Claims, 3 Drawing Sheets

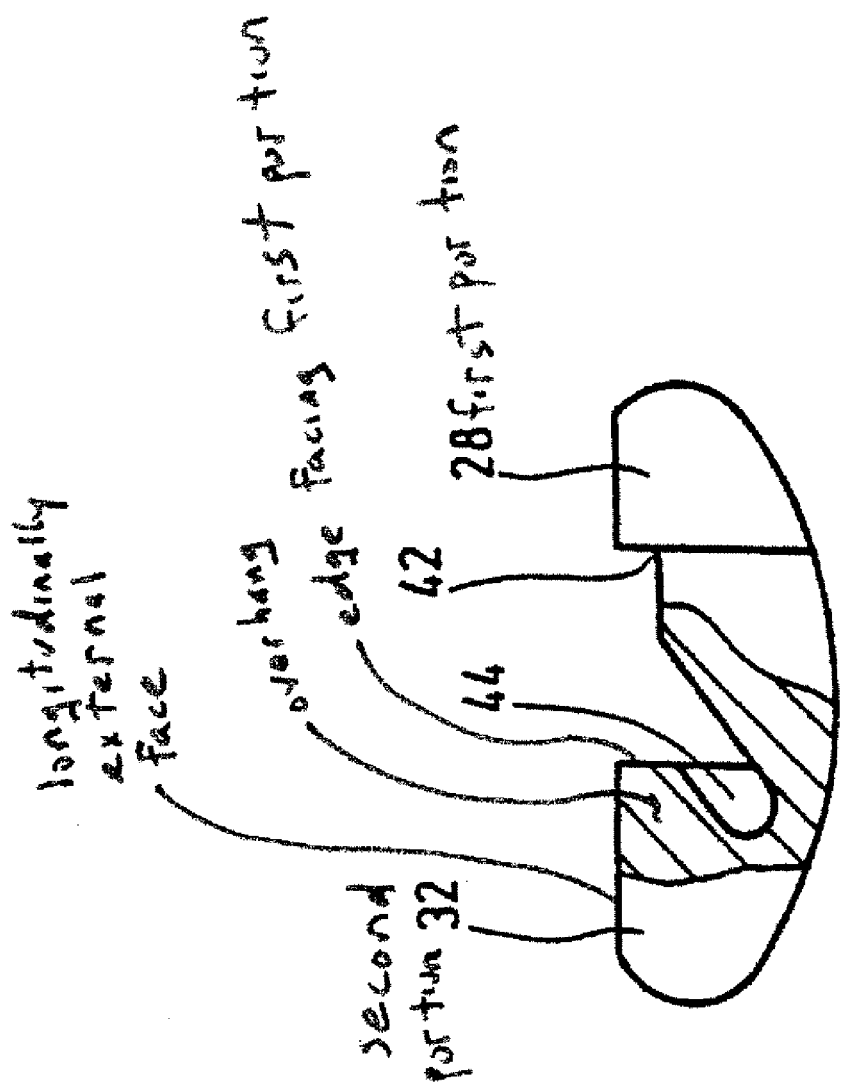

FORCE TRANSDUCER FOR MEASURING AXIAL FORCES

RELATED APPLICATION

This is a continuation application of co-pending International Patent Application PCT/EP2004/000305 filed on Jan. 16, 2004 which designates the United States and claims priority of German application DE 103 02 349.6 filed on Jan. 16, 2003 which is fully incorporated by reference herewith.

BACKGROUND OF THE INVENTION

The invention relates to a force transducer for measuring axial forces which act essentially transversely on an axis. In particular, the invention relates to a force transducer for measuring forces acting transversally on a measuring axis.

RELATED PRIOR ART

A force transducer of this type is generally known.

A force transducer of the type mentioned at the outset is used for the purpose of measuring forces which act essentially transversely on an axis or shaft of rotating parts of machines or installations. Axial forces of this type may comprise a force acting purely radially on the axis or a torsional force. For example, a force transducer of this type is used for measuring axial forces on cable rollers, for example in cableways. The measurement of axial forces serves in this application in particular for recording instances of overloading of the cable rollers, to allow dangerous states to be detected in time.

Conventional force transducers of the type mentioned at the outset have a longitudinally extending axial body which is formed essentially in one solid piece. The axial body is usually designed with regard to its dimensioning and strength for the respective application, and it must also have a corresponding fatigue strength with respect to load changes.

The axial body generally has a force introduction zone. The force introduction zone is understood as meaning that portion of the axial body in which the force to be measured is introduced into the force transducer. In the case of the example of the application of the force transducer for measuring axial forces in a cable roller, the force introduction zone of the axial body is that axial region at which the cable roller is directly or indirectly supported.

The axial body also has at least one, usually two, force measuring zones, which is or are usually arranged axially outside the force introduction zone. At least one force measuring system is respectively arranged in the at least one force measuring zone or in the at least two force measuring zones. The force measuring system can detect shearing forces, extensions and compressions in the axial body and converts these into measurable signals, for example electrical signals, to determine the force. For example, the force measuring system or systems has or have strain gauges, which make it possible for force to be measured on the basis of changes in resistance within one or more bridge circuits. However, other force measuring systems based on other physical principles for detecting forces may also be used.

For their intended use, force transducers for measuring axial forces are usually inserted into a kind of mounting fork or mount or bearing, as is the case for example in the application of the force transducer for measuring axial forces in a cable roller. In a corresponding way, the axial body has at least one, usually two, bearing zones axially outside the force introduction zone for the direct or indirect bearing of the force transducer in a mount. When the measuring axis is in use, the at least one bearing zone is subjected to forces which are directed counter to the forces acting on the force introduction zone. The at least one bearing zone consequently acts as an abutment with respect to the force introduction zone.

In the case of conventional force transducers, hysteresis effects are encountered in practical use during the force measurement. Hysteresis or hysteresis error is the term used to refer to the varying shape of the characteristic curve upon increasing and decreasing loading. The hysteresis is caused by frictional effects which occur under the deformations of the force transducer at the contact points with other parts. In actual fact, these frictional effects occur at the contact points of the force transducer in the region of its at least one bearing zone with the mount in which the portion of the axial body forming the at least one bearing zone is mounted. This is so because, when a force is introduced, the force transducer bends in the region between the mounts, i.e. between the bearing zones, even if this is not visually perceptible, i.e. is in the millimeter or submillimeter range. If the force transducer is loaded with high force from the unloaded state and is subsequently relieved of load again, these aforementioned frictional forces have the effect that the force transducer remains in a stressed state once the force has subsided, because of the high frictional forces, i.e. does not relax elastically into a state corresponding to the actual force introduced. This has the result that the at least one force measuring system momentarily detects an apparently higher force than corresponds to the force actually introduced. The force measurement is consequently influenced by parasitic or apparent forces, which however prevents a force measurement that is as accurate as possible.

Apparent forces of this type may also occur if the force transducer is fitted in bearings that are not exactly in line with one another. When the force transducer is fitted, stresses of the force transducer may occur, which are recorded by the force measuring device or the force measuring devices without constituting an axial force that is actually to be measured. It must be taken into account here that force measuring devices based on strain gauges respond to instances of shearing, expansion and compression even in the submillimeter range and that production tolerances of the mounting bearings in which the force transducers are fitted are at least likewise of this order of magnitude.

The invention is therefore based on the object of developing a force transducer of the type mentioned at the outset to the extent that the measuring accuracy of the force transducer is improved.

SUMMARY OF THE INVENTION

According to one aspect of the invention, a force transducer is provided. The force transducer has a longitudinally extending axial body which has a first portion, forming a force introduction zone, at least one second portion, forming a bearing zone for bearing the force transducer in a mount, and at least one third portion, forming a force measuring zone for measuring the axial forces. The axial body has in the region of the at least one second portion, radially at a distance from the outside thereof, at least one recess extending in a circumferential direction and is directed essentially axially, such that an edge of the second portion that is facing the first portion forms a free overhang.

The axial body of the force transducer according to the invention accordingly has in the region of the at least one second portion, which forms the at least one bearing zone of the force transducer, a recess in the form of an indentation or groove. This achieves the effect that the region in which the axial body contacts the mount, in which the force transducer is mounted, is decoupled from the remaining axial body, and consequently in particular from the portion of the axial body forming the force measuring zone, whereby parasitic forces or apparent forces, such as those caused by frictional forces occurring in the contact regions, do not have any disturbing influence on the actual force measurement. Rather, only the axial forces that are actually to be measured are detected by the at least one force measuring system. This is so because the edge of the second portion forming the bearing zone that is facing the first portion, i.e. the force introduction zone, has on account of the way in which it is configured according to the invention a certain relative mobility with respect to the remaining axial body and forms a kind of "joint" when the axial body bends in the event of a force in the millimeter or submillimeter range being introduced. In a corresponding way, such a relative movement in the submillimeter range is already adequate to reduce measuring errors significantly. As a result, stresses of the force transducer caused by a fitting situation in which it is affected by tolerances or caused by high frictional forces in the region of the bearing zone are essentially not transmitted to the axial body and the force measuring system connected to it, and as a result cannot have an adverse effect on the accuracy of the force measurement. Consequently, a hysteresis in the force measurement is advantageously reduced.

According to another aspect of the present invention, there is provided a force transducer having a longitudinal axis, for measuring an axial force which acts essentially transversely on said longitudinal axis, said force transducer having a longitudinally extending axial body, said axial body having a first portion, at least one second portion, and at least one third portion, said first portion forming a force introduction zone, said at least one second portion forming a bearing zone for bearing the force transducer, having an edge facing said first portion and a longitudinally extending external face, and said at least one third portion forming a force measuring zone for measuring said axial force between said first and second portions, and having a smaller diameter than said first and second portions, said axial body having at least one recess in said at least one second portion, wherein said recess is spaced radially relative to said external face, extends in a circumferential direction of said axial body, and is substantially directed axially relative to said axial body, such that said edge of said second portion facing said first portion forms a free overhang, wherein said recess follows said third portion.

According to another aspect of the present invention, there is provided a force transducer having a longitudinal axis, which extends in an axial direction, for measuring a force which acts substantially transverse to said longitudinal axis, said force transducer having an axially extending body, said body having a first portion, at least one second portion, and at least one third portion, said first portion forming a force introduction zone, said at least one second portion forming a bearing zone for bearing the force transducer, having an edge facing said first portion, and having an axially extending external face, said at least one third portion forming a force measuring zone, which is disposed between and has a smaller diameter than said first and second portions, for measuring said transverse force, said body having at least one recess in said at least one second portion, wherein said recess is spaced radially relative to said external face, extends circumferentially relative to said body, and is substantially directed axially relative to said body, such that said edge of said second portion forms a free overhang.

In a preferred embodiment, the at least one third portion, which forms the force measuring zone, is arranged between the first and second portions or at least partially overlaps with the at least one second portion or coincides with it.

This measure has the advantage that the previously described "jointness" between the bearing zone and the remaining axial body is located in the direct vicinity of the force measuring zone of the axial body, whereby stresses caused by parasitic forces such as frictional forces have the least effect on the actual force measurement, or such parasitic forces are optimally decoupled from the force measuring zone.

In a further preferred embodiment, the recess extends over a full circumference of 360° on the axial body.

This configuration is of advantage in particular in the case of full circumferential mounting of the force transducer in a mount, since in such a case the contact region between the outer side of the force transducer and the mount likewise extends fully circumferentially and optimum decoupling of such contact regions from the force measuring zone is always achieved, in the sense that parasitic or apparent forces such as frictional forces and stresses do not have adverse effects on the force measurement.

In a further preferred embodiment, the axial body has at the transition from the first portion to the at least one second portion a portion having a smaller diameter than the first and second portions, which is followed by the at least one recess.

This measure further contributes to improved decoupling of the contact region of the force transducer with the mount in which the force transducer is mounted from the force measuring zone, because the "jointness" of the axial body in the region of the bearing zone is increased still further by the portion of smaller diameter. Furthermore, this configuration makes it possible to provide the overhanging edge of the second portion, forming the bearing zone, with a still adequate material thickness to ensure in this way a corresponding required stability of the force transducer in the region of the bearing zone.

In this connection, it is preferred if the portion having the smaller diameter tapers toward the second portion.

In this case, the recess preferably follows the tapering angle of the portion of smaller diameter continuously or with the same angle, whereby the recess extends approximately obliquely with respect to the longitudinal axis of the axial body, which is likewise to be understood as included by the term "essentially axially". In this way, the desired decoupling of the second portion, forming the bearing zone, from the remaining axial body continues to be ensured, while the edge of the second portion, forming the bearing zone, still has a sufficient strength not to bend toward the axial body in the case where the force transducer is used for measuring high forces.

In a further preferred embodiment, the third portion, forming the force measuring zone, coincides with the portion of smaller diameter.

This measure has the advantage that a particularly sensitive force measurement is made possible, since instances of expansion, compression and shearing have the strongest effects in the region of the portion having the smaller diameter. Furthermore, optimum decoupling between parasitic or apparent forces and the force measuring zone is achieved in this way, since the free edge of the bearing zone is also located in this region.

In a further preferred embodiment, the recess extends axially into the bearing zone to a depth of about 2 to 10 mm.

The dimensioning of the axial depth of the recess is based on the dimensioning of the axial body in dependence on the maximum force to be measured, to be precise in the sense of most effective decoupling between the contact region of the bearing zone of the axial body and the force measuring zone.

In a further preferred embodiment, the axial body has at least two second portions, respectively forming a bearing zone, which are arranged on both sides of the first portion, the axial body having in the region of both second portions, radially at a distance from the outside thereof, in each case at least one recess extending in the circumferential direction and directed essentially axially, such that a respective edge of the second portions that is facing the first portion forms a free overhang.

As already mentioned, for measuring axial forces, such force transducers are usually mounted in two mounts that are present on both sides of the force introduction zone, so that the aforementioned measure has the advantage that both bearing zones of the force transducer are decoupled from the force measuring zone, which is of advantage in particular whenever, for reasons of redundancy, there is a force measuring zone with a corresponding number of force measuring systems on the axial body respectively on both sides of the force introduction zone.

Further advantages and features emerge from the description which follows and the accompanying drawings.

It is to be noted that the features mentioned above and still to be explained below can be used not only in the combination respectively specified but also other combinations or on their own without departing from the scope of the present invention.

BRIEF DESCRIPTION OF THE DRAWINGS

An exemplary embodiment is represented in the drawing and described in more detail hereafter with reference to said drawing, in which:

FIG. 3 shows an enlarged representation of the cutout X in FIG. 2.

DESCRIPTION OF PREFERRED
EMBODIMENTS

Figure 1:
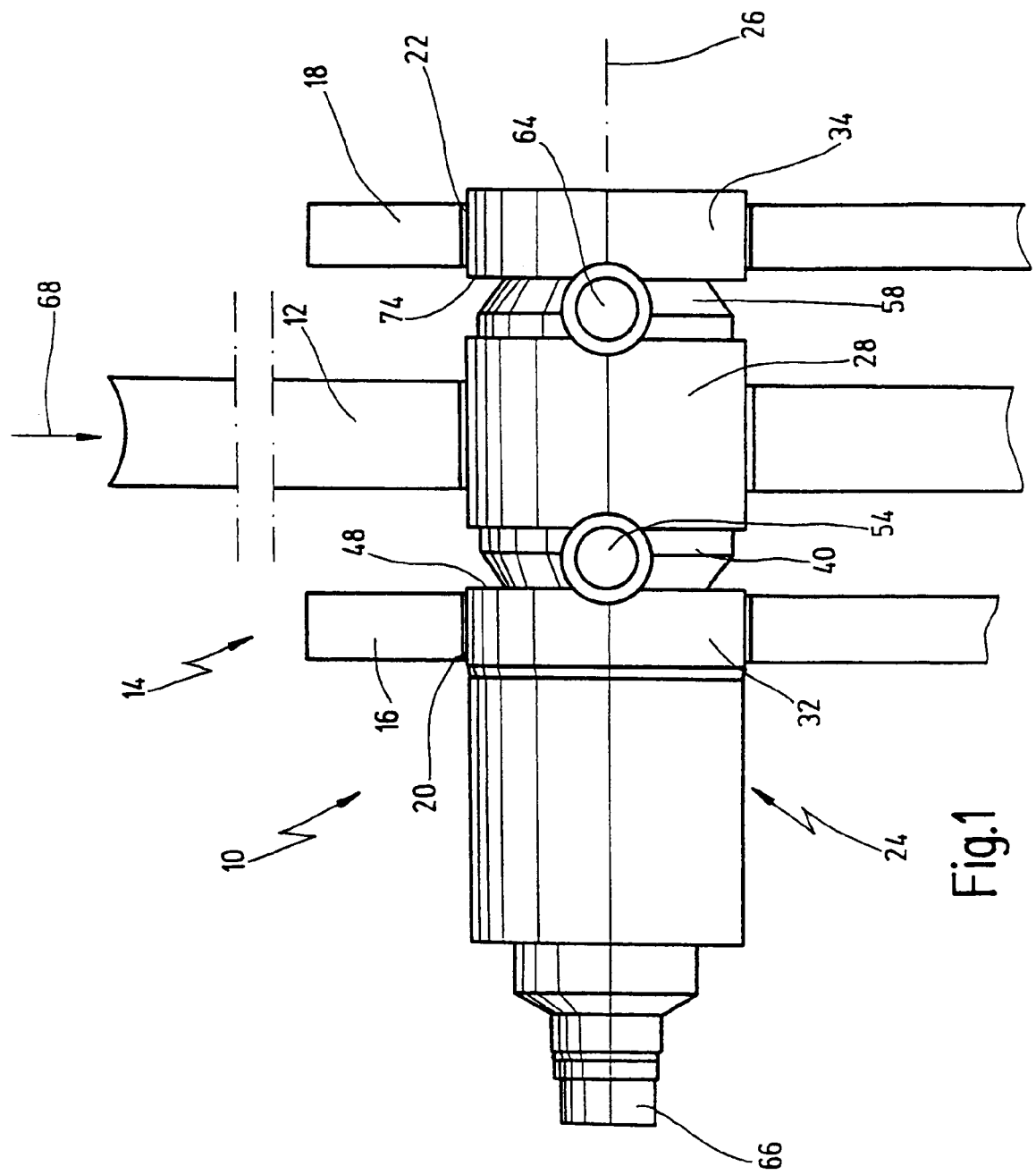
FIG. 1 shows a side view of a force transducer for measuring axial forces in a fitting situation shown by way of example for a cable roller, which is partly represented in section.
Figure 2:
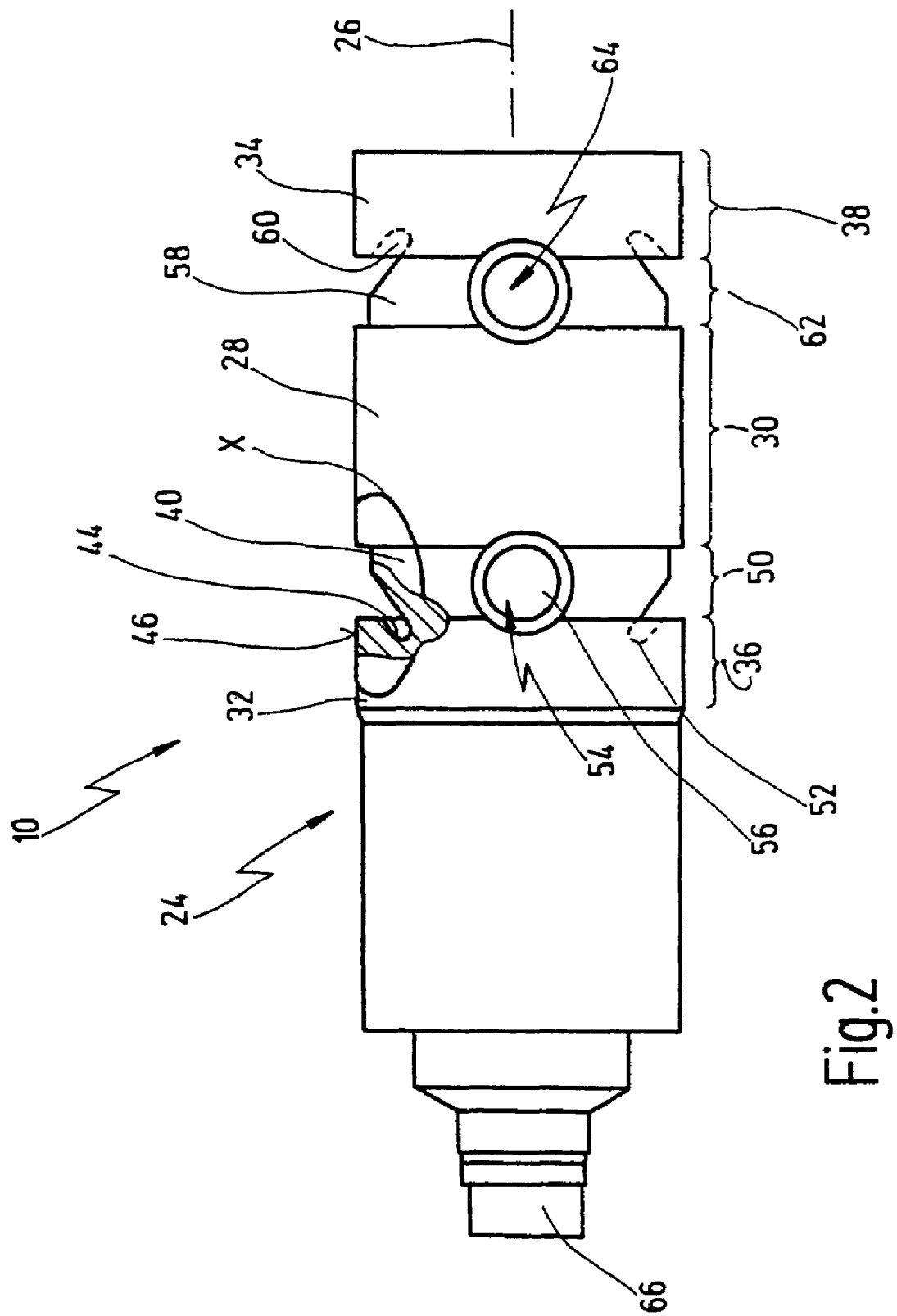
FIG. 2 shows the force transducer in FIG. 1 on its own with a partly broken open portion, which shows a detail of the force transducer.

In FIGS. 1 and 2, a force transducer, provided with the general designation 10, for measuring axial forces which act essentially transversely on an axis, is represented. The force transducer 10 is also referred to as the measuring axis.

In FIG. 1, the force transducer 10 is shown, by way of example, in the fitted state as a measuring axis for a cable roller 12. By means of the force transducer 10 it is intended to measure the axial forces acting as a result of the cable (not represented) on the measuring axis 10, which forms the axis of the cable roller 12, essentially transversely with respect to the measuring axis 10, which may also comprise torsional force As represented in FIG. 1, the force transducer 10 is fixed in a mount 14 in the manner of a mounting fork, which has two legs 16 and 18, in bores 20 and 22 provided therein.

Further with reference to FIG. 2, the force transducer 10 has an axial body 24, which is formed essentially as one part and integrally and in one solid piece.

The axial body 24 generally has an essentially cylindrical rotational symmetry about a longitudinal axis 26.

The longitudinally extending axial body 24 has a first portion 28, which forms a force introduction zone 30.

On both sides of the first portion 28, the axial body 24 has two second portions 32 and 34, which form a bearing zone 36 and 38, respectively.

The first portion 28 and the second portions 32 and 34 have an essentially equal outside diameter.

Between the first portion 28 and the second portion 32, the axial body 24 has a portion 40, which has a smaller diameter than the first portion 28 and the second portion 32. The portion 40 forms a transition from the first portion 28 to the second portion 32. The portion 40 of smaller diameter goes over into the first portion 28 with a rounding 42, in order to avoid notch effects, which may be manifested as weakened points, when the force transducer 10 is subjected to the loading of a force transversely with respect to the longitudinal axis 26.

In the region of the second portion 32, the axial body 24 has a recess 44 in the form of an indentation or groove, which is radially at a distance from the outside 46 of the axial body 24, so that an edge 48 of the second portion 32 that is facing the first portion 28 forms a free overhang. The recess 44 is correspondingly open at its end facing the first portion 28, as revealed by FIG. 2 and, in particular, FIG. 3, in which the recess 44 is shown enlarged.

The recess 44 is essentially axially directed, in the exemplary embodiment shown obliquely with respect to the longitudinal axis 26 of the axial body.

The recess 44 extends over a full circumference of 360° on the axial body 24.

The recess 44 extends axially into the second portion 32, forming the bearing zone 36, to a depth of about 2 to 10 mm, the depth of the recess 44 depending on the dimensioning of the axial body 24 and the maximum force to be measured with it.

The portion 40 of smaller diameter at the same time forms a third portion of the axial body 24, which forms a force measuring zone 50 of the axial body 24. The portion 40, which accordingly at the same time forms the force measuring zone 50, tapers in the way shown in FIGS. 2 and 3 toward the second portion 32, the recess 44 following the taper with the same tapering angle.

An inner end 52 of the recess 44 is formed in a rounded manner, in order also to avoid a notch effect here.

In the portion 40, forming the force measuring zone 50, a force measuring system 54 (not represented in more detail) is arranged. The force measuring system 54 is formed for example on the basis of strain gauges, the strain gauges being embedded in a blind-hole bore in the portion 40 of the axial body 24 and being firmly connected to the axial body 24. This blind-hole bore, receiving the strain gauges, is hermetically sealed with respect to the outside by a cover 56, such that the force measuring system 54 is protected against environmental influences.

Arranged on the side of the first portion 28 that is opposite from the second portion 32 is a further portion 58 of smaller diameter, which forms the transition from the first portion 28 to the second portion 34. In the region of the second portion 34, the axial body 24 has a further recess 60, which is arranged and formed mirror-symmetrically with respect to the recess 44, in the same way as the further portion 58 of smaller diameter, so that in this respect reference can be made to the description of the recess 44 and the portion 40 of smaller diameter.

The portion 58 of smaller diameter forms a further force measuring zone 62, in which a force measuring system 64 (not represented in more detail) is arranged for the purpose of redundancy of the force measurement.

The force measuring systems 54 and 64 are capable of responding to instances of compression, expansion and shearing of the material of the axial body 24 in the region of the portions 40 and 58 as a result of the axial forces to be measured by a change in resistance and capable of generating a corresponding electrical signal. For this purpose, on the force transducer 10 there is a terminal 60 for connecting an electrical power-supply and signal-transmission cable (not represented), bores or channels (not represented in any more detail) being present in the axial body 24 for power lines to establish the electrical connection to the force measuring systems 54 and 64.

The axial body 24 is produced essentially in one piece and has no sleeves or coverings when it is fitted, as represented in FIG. 1, in the mount 14 for measuring axial forces, for example of the cable roller 12.

In FIG. 1, the direction of the force introduction of the cable roller 12 with respect to the force transducer 10 is represented by way of example with an arrow 68. The legs 16 and 18, in which the force transducer 10 is mounted with its portions 32 and 34, represent abutments for the force introduction into the force introduction zone 30. Acting on the portions 32 and 34 of the axial body 24 in a way corresponding to a force being introduced according to the arrow 68 are counter forces, which are directed in the sense of an abutment in the direction of arrows 70 and 72.

In the case of a force being introduced in the direction of the arrow 68 onto the force transducer 10, the axial body 24 bends in the millimeter or submillimeter range, the recesses 44 and 60 allowing the first portion 28 to perform a relative movement with respect to the second portions 32 and 34 in the millimeter or submillimeter range. This relative mobility has the effect that, in spite of the frictional forces which act on the portions 32 and 34 in the bores 20 and 22 of the legs 16 and 18 of the mount 14, the axial body 24 can relax as the force introduced subsides into a state which actually corresponds to the force introduced. The frictional forces consequently do not act parasitically on the force measuring zones 50 and 62 or the portions 40 and 58 in which the force measurement takes place.

In a modification of the exemplary embodiment shown, the edge 48 of the second portion 32 or the opposite edge 74 of the second portion 34 could be slit, although such slits are not to be understood as meaning a recess in the sense of the recesses 44 and 60.

What is claimed is:

1. A force transducer having a longitudinal axis, for measuring an axial force which acts essentially transversely on said longitudinal axis,
said force transducer having a longitudinally extending axial body (24),
said axial body having a first portion (28), at least one second portion (32, 34), and at least one third portion (40, 58),
said first portion (28) forming a force introduction zone (30);
said at least one second portion forming a bearing zone (36, 38) for bearing the force transducer (10), having an edge facing said first portion and a longitudinally extending external face; and said at least one third portion (40, 58) forming a force measuring zone (50, 62) for measuring said axial force, said axial body (24) having at least one recess (44, 60) in said at least one second portion (32, 34),
wherein said recess is spaced radially relative to said external face, extends in a circumferential direction of said axial body, and is substantially directed axially relative to said axial body, such that said edge (48, 74) of said second portion (32, 34) facing said first portion (28) forms a free overhang.

2. The force transducer as claimed in claim 1, wherein said at least one third portion (40, 48), which forms said force measuring zone (50, 62), is arranged between said first and second portions (28, 32, 34).

3. The force transducer as claimed in claim 1, wherein said at least one third portion (40, 48) at least partially overlaps with said at least one second portion (32, 34).

4. The force transducer as claimed in claim 1, wherein said at least one third portion (40, 48) coincides with said second portion.

5. The force transducer as claimed in claim 1, wherein said recess (44, 60) extends over a full circumference of 360° on said axial body (24).

6. The force transducer as claimed in claim 1, wherein said axial body (24) has, at a transition from said first portion (28) to said at least one second portion (32, 34), a fourth portion (40, 58) which has a smaller diameter than said first and second portions (28, 32, 34), said fourth portion being followed by said at least one recess (44, 60).

7. The force transducer as claimed in claim 6, wherein said fourth portion (40, 58) having said smaller diameter tapers toward said second portion (32, 34).

8. The force transducer as claimed in claim 4, wherein said third portion, forming the force measuring zone (50, 62), coincides essentially with said fourth portion (40, 58).

9. The force transducer as claimed in claim 1, wherein said recess (44, 60) extends axially into said bearing zone (36, 38) to a depth of about 2 to 10 mm.

10. The force transducer as claimed in claim 1, wherein said axial body (24) has at least two second portions (32, 34), respectively forming one bearing zone (36, 38), which are arranged on both sides of said first portion (28), said axial body (24) having in both of said second portions (32, 34), respectively at least one recess (44, 60), each of said recesses being spaced radially from said respective external surface, extending in said circumferential direction and being directed essentially axially, such that each of said edges (48, 74) of said second portions (32, 34) forms one free overhang.

11. A force transducer having a longitudinal axis, for measuring an axial force which acts essentially transversely on said longitudinal axis,
said force transducer having a longitudinally extending axial body (24),
said axial body having a first portion (28), at least one second portion (32, 34), and at least one third portion (40, 58),
said first portion (28) forming a force introduction zone (30);
said at least one second portion forming a bearing zone (36, 38) for bearing the force transducer (10), having an edge facing said first portion and a longitudinally extending external face;
and said at least one third portion (40, 58) forming a force measuring zone (50, 62) for measuring said axial force between said first and second portions, and having a smaller diameter than said first and second portions, said axial body (24) having at least one recess (44, 60) in said at least one second portion (32, 34), wherein said recess is spaced radially relative to said external face, extends in a circumferential direction of said axial body, and is substantially directed axially relative to said axial body, such that said edge (48, 74) of said second portion (32, 34) facing said first portion (28) forms a free overhang, wherein said recess follows said third portion.

12. The force transducer as claimed in claim 11, wherein said at least one third portion (40, 48), which forms said force measuring zone (50, 62), is arranged between said first and second portions (28, 32, 34) or at least partially overlaps with said at least one second portion (32, 34) or coincides therewith.

13. The force transducer as claimed in claim 11, wherein said recess (44, 60) extends over a full circumference of 360° on said axial body (24).

14. The force transducer as claimed in claim 11, wherein said axial body (24) has, at a transition from said first portion (28) to said at least one second portion (32, 34), a fourth portion (40, 58) which has a smaller diameter than said first and second portions (28, 32, 34), said fourth portion being followed by said at least one recess (44, 60).

15. The force transducer as claimed in claim 14, wherein said fourth portion (40, 58) having said smaller diameter tapers toward said second portion (32, 34).

16. The force transducer as claimed in claim 14, wherein said third portion, forming the force measuring zone (50, 62), coincides essentially with said fourth portion (40, 58).

17. The force transducer as claimed in claim 11, wherein said recess (44, 60) extends axially into said bearing zone (36, 38) to a depth of about 2 to 10 mm.

18. The force transducer as claimed in claim 11, wherein said axial body (24) has at least two second portions (32, 34), respectively forming one bearing zone (36, 38), which are arranged on both sides of said first portion (28), said axial body (24) having in both of said second portions (32, 34), respectively at least one recess (44, 60), each of said recesses being spaced radially from said respective external surface, extending in said circumferential direction and being directed essentially axially, such that each of said edges (48, 74) of said second portions (32, 34) forms one free overhang.

19. A force transducer having a longitudinal axis, which extends in an axial direction, for measuring a force which acts substantially transverse to said longitudinal axis, said force transducer having an axially extending body (24), said body having a first portion (28), at least one second portion (32, 34), and at least one third portion (40, 58), said first portion (28) forming a force introduction zone (30), said at least one second portion forming a bearing zone (36, 38) for bearing the force transducer (10), having an edge facing said first portion, and having an axially extending external face, said at least one third portion (40, 58) forming a force measuring zone (50, 62), which is disposed between and has a smaller diameter than said first and second portions, for measuring said transverse force, said body (24) having at least one recess (44, 60) in said at least one second portion (32, 34), wherein said recess is spaced radially relative to said external face, extends circumferentially relative to said body, and is substantially directed axially relative to said body, such that said edge (48, 74) of said second portion (32, 34) forms a free overhang.

20. The force transducer as claimed in claim 19, wherein said at least one third portion overlaps at least partially with said at least one second portion (32, 34) or coincides therewith.

21. The force transducer as claimed in claim 19, wherein said third portion tapers toward said second portion.

\* \* \* \* \*